(12) United States Patent
Jewett et al.

(10) Patent No.: US 7,134,695 B2
(45) Date of Patent: Nov. 14, 2006

(54) FITTINGS AND METHOD OF USE

(75) Inventors: Robert Jewett, Franklin, MA (US);
William Mallonee, Auburn, MA (US);
Bengt Olson, Westborough, MA (US)

(73) Assignee: Terracon Corporation, Holliston, MA (US)

( * ) Notice: Subject to any disclaimer, the term of this patent is extended or adjusted under 35 U.S.C. 154(b) by 63 days.

(21) Appl. No.: 10/767,312

(22) Filed: Jan. 29, 2004

(65) Prior Publication Data

US 2005/0184512 A1   Aug. 25, 2005

(51) Int. Cl.
*F16L 5/00* (2006.01)
(52) U.S. Cl. .................. 285/141.1; 285/204; 285/14
(58) Field of Classification Search ............ 285/141.1, 285/139.1, 139.2, 139.3, 204, 207, 364, 353, 285/14
See application file for complete search history.

(56) References Cited

U.S. PATENT DOCUMENTS

| 1,517,242 | A | * | 12/1924 | Lowrey | 285/334.3 |
|---|---|---|---|---|---|
| 1,783,410 | A | * | 12/1930 | Cowell | 285/236 |
| 2,153,664 | A | * | 4/1939 | Freedlander | 285/353 |
| 2,293,943 | A | * | 8/1942 | Merker et al. | 285/89 |
| 3,430,990 | A | * | 3/1969 | Nelson | 285/346 |
| 3,679,237 | A | * | 7/1972 | De Angelis | 285/109 |
| 4,174,126 | A | * | 11/1979 | Hauff | 285/136.1 |
| 4,353,580 | A | * | 10/1982 | Houck | 285/39 |
| 4,491,347 | A | * | 1/1985 | Gustafson | 285/47 |

OTHER PUBLICATIONS

NAConnect, downloaded from http://www.novaseptic.com on Jul. 13, 2004.

* cited by examiner

*Primary Examiner*—David Bochna
(74) *Attorney, Agent, or Firm*—Fish & Richardson P.C.

(57) ABSTRACT

An article for connecting a fluid conduit and a fluid container includes a receptacle configured to receive the fluid conduit. The receptacle has a base defining an opening for providing communication between the container and the fluid conduit and a sealing surface at least partially surrounded by a wall extending from the base. The wall is also configured to extend about the fluid conduit.

24 Claims, 7 Drawing Sheets

FITTINGS AND METHOD OF USE

BACKGROUND

This invention relates to fittings, and more particularly to fittings for connecting a fluid conduit and a container.

Generally, fittings can be used to connect lengths of piping or tubing together. Frequently, one end of a pipe or tube is fluidly connected to some form of fluid reservoir and the other end is fluidly connected to process piping or tubing, e.g., to direct fluid toward or away from the reservoir. In-line connectors connect ends of piping or tubing together using a sealing gasket positioned there-between to form a seal that is distally spaced from the reservoir. The seal can be a critical feature of the assembly, particularly in high purity applications.

SUMMARY

Aspects of the invention feature a connector assembly suitable for use as a plumbing connection of liquid-carrying tubing or piping to a container.

In an aspect, the invention features an article for connecting a fluid conduit and a fluid container. The article includes a receptacle configured to receive the fluid conduit. The receptacle has a base with an opening for providing communication between the container and the fluid conduit and a sealing surface at least partially surrounded by a wall extending from the base. The wall is configured to extend about the fluid conduit.

In another aspect, the invention features an article for connecting a fluid conduit and a fluid container. The article includes a collar defining an opening therethrough, the opening configured to receive the fluid conduit, and a receptacle configured to receive the fluid conduit. The receptacle includes a base defining an opening for providing communication between the container and the fluid conduit and a sealing surface at least partially surrounded by a wall extending from the base. The wall is configured to extend about the fluid conduit.

In another aspect, the invention features a container that includes an article disposed on the container. The article includes a receptacle configured to receive a fluid conduit. The receptacle has a base defining an opening for providing fluid communication between the container and the fluid conduit and a sealing surface at least partially surrounded by a wall extending from the base. The wall is configured to extend about the fluid conduit.

In another aspect, the invention features a method of assembling a fitting assembly. The method includes positioning a collar about a fluid conduit, the collar defining an opening configured to receive the fluid conduit. The collar and the fluid conduit are secured within a receptacle configured to receive the collar and the fluid conduit. The receptacle includes a base having an opening and a sealing surface at least partially surrounded by a wall extending from the base. The wall is also configured to extend about the collar. A passageway is sealed that is defined by the opening of the base and the fluid conduit.

Aspects of the invention may include one or more of the following features. The opening of the base can be capable of fluid communication with the fluid conduit with the sealing surface providing a seal to inhibit leakage as fluid moves along a fluid passageway defined, at least in part, by the opening of the base and the fluid conduit.

The wall can define a passageway extending from an outer surface of the wall to an inner surface of the wall. This passageway can provide a drainage passageway, e.g., once the fluid conduit is removed.

The receptacle may be suitable for use as part of a sanitary plumbing connection. The receptacle may comprise a thermoplastic material, such as polypropylene, polyethylene, polyvinylidene fluoride and polytetrafluoroethylene. The receptacle may comprise stainless steel.

The article or fitting assembly can include a sealing member seated adjacent the sealing surface. The sealing member can be a gasket. The sealing surface can define a groove configured to mate with a rib defined by a surface of the sealing member.

The receptacle can be configured to receive the collar and the fluid conduit with the wall configured to extend about the collar. A fastener can be used to secure the collar to the receptacle. The fastener can be defined by a threaded outer surface of the collar and a mating threaded inner surface of the wall and/or the fastener can be a clamp.

The collar and the receptacle can each include a flange extending outwardly from an associated outer surface. A clamp can be provided for providing a force at a surface of the flanges capable of securing the collar and receptacle.

The article or fitting assembly can include a fluid conduit extending through the opening of the collar. The fluid conduit may include a flange extending from an outer surface at an end of the fluid conduit. The flange of the fluid conduit may be positioned between the collar and sealing surface. The collar can include a seating surface configured to seat against a surface of the flange of the fluid conduit. An end of the fluid conduit may define a second sealing surface. A sealing member may be positioned between the sealing surfaces of the base and the fluid conduit.

Methods may include securing the collar and the fluid conduit within the receptacle includes fastening the collar to the receptacle. The collar can be secured to the receptacle by a clamp and/or the collar can be secured to the receptacle by mating threaded surfaces. The threaded surfaces can be defined by an outer surface of the collar and an inner surface of the wall of the receptacle.

The collar can be seated against a flanged surface of the fluid conduit. An end surface of the fluid conduit can be seated within the receptacle.

One or more advantages can be provided from the above. The sealing surface of the base is relatively protected, for example, from physical damage, by being surrounded, at least partially, by a wall of the receptacle. The sealing surface of the base can be positioned relatively near the container surface by securing the receptacle directly to the surface of the container. The opening through the base of the receptacle can be capable of direct fluid communication with the fluid conduit such that additional piping or tubing extending through the opening of the base is not necessary.

The receptacle can be configured such that the welding surface of the receptacle can welded to the surface of the container about the opening of the base, forming a first weld and along an outer periphery of the base, forming a second weld. This can provide increased stability and increased sealing function.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
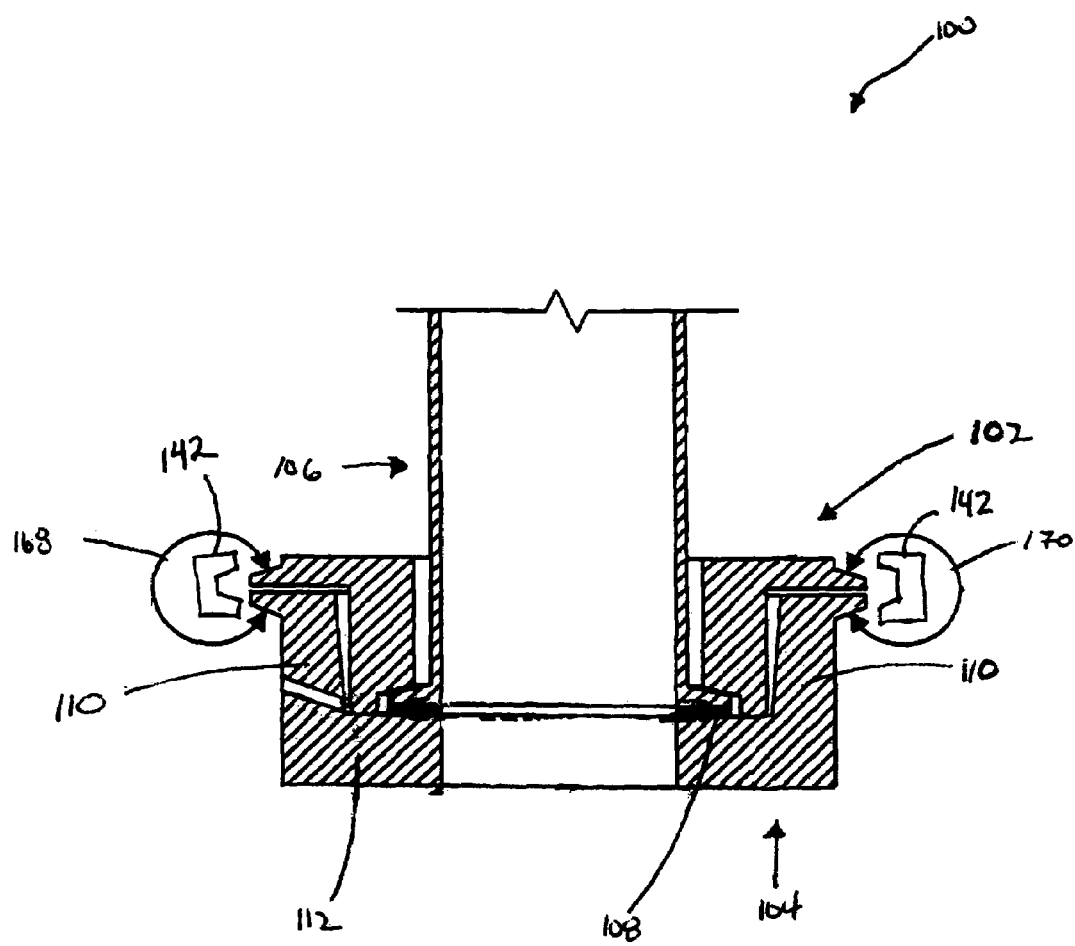
FIG. 1 is a sectional view of an assembled fitting assembly embodiment

Referring to FIG. 1, a connector assembly 100 (e.g., suitable for use as a sanitary or aseptic plumbing connection of liquid-carrying tubing or piping to the top, side or bottom of a container) includes a collar 102 and a receptacle 104 that is configured to receive the collar 102 and a fluid conduit 106. As described below, the receptacle 104 includes a sealing surface 108 that is surrounded by a wall 110 extending outwardly from a base 112 of the receptacle 104. As assembled, the receptacle 104, among other things, protects the sealing surface 108 from physical damage, e.g., resulting from unintended physical contact during transport. The collar 102 secures the fluid conduit 106 in the receptacle 104.

Figure 2:
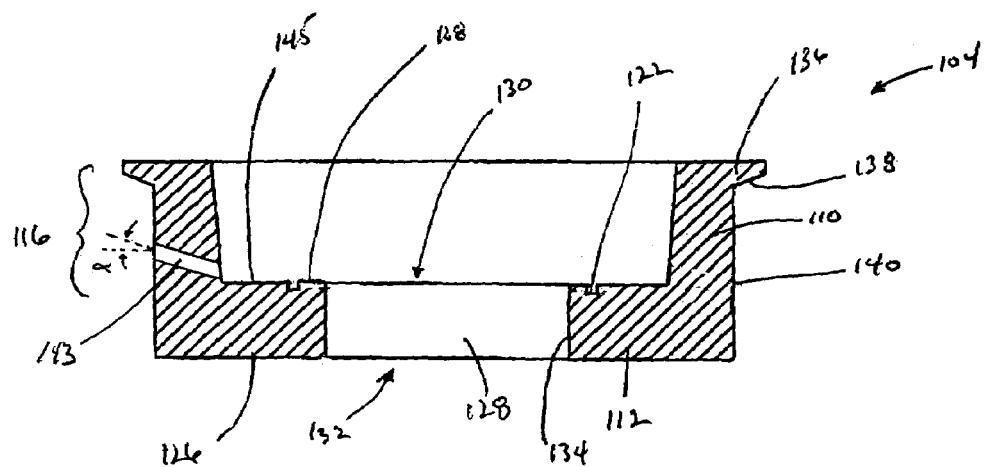
FIGS. 2 and 2A are sectional and top views, respectively, of a receptacle of FIG. 1.
Figure 2A:
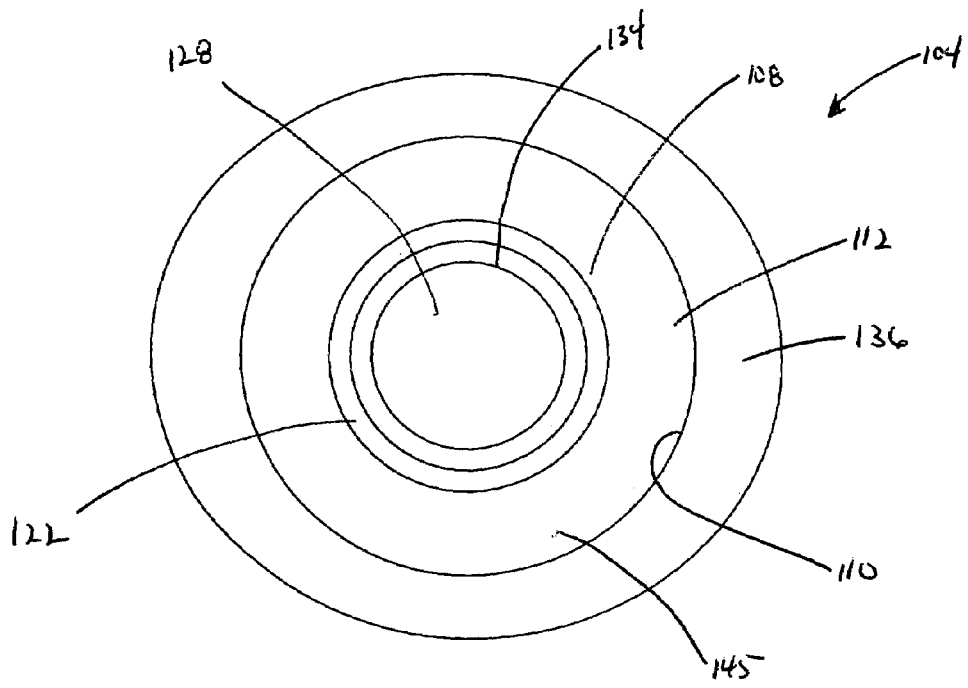

Referring to FIGS. 2 and 2A, the receptacle 104 includes the base 112 and the wall 110 extending outwardly from the base 112. FIG. 2A, shows the wall 110 extending about the entire periphery of the base 112, in a generally circular fashion, forming a tubular receiving portion 116 (FIG. 2) of the receptacle 104. In some embodiments, the wall 110 extends about only a portion (e.g., as multiple, discontinuous wall segments) of the periphery of the base 112. Although wall 110 is shown in the form a solid, circular tube extending from the base, other configurations are contemplated such as a rectangular tube including a square tube, an oval tube, etc. Also, in some variations, the wall 110 is relatively porous (e.g., formed of screen or mesh). The wall 110 can extend integrally from the base 104, as illustrated by FIG. 2, or the wall 110 can be formed as a separate component and attached to the base 112, such as by welding and/or adhesives.

Upon assembly of the fitting assembly 100, the wall 110 of the receptacle 104 is shaped to extend about the collar 102, the fluid conduit 106 and the sealing surface 108 providing a protective barrier for the sealing surface 108, e.g., to inhibit physical damage to the seals located within the receptacle 104 (see FIG. 1).

Referring still to FIGS. 2 and 2A, the sealing surface 108 is formed by a surface 145 of the base 112. The sealing surface 108 is sized to receive a sealing member 120 (e.g., a gasket, such as a model 40MP-PX available from Newman Gasket Company of Lebanon, Ohio) to provide a fluid-tight seal between the receptacle 104 and the sealing member 120 (see FIGS. 1 and 4). The sealing surface 108 forms an alignment groove 122 that mates with a corresponding ridge 124 extending from a surface 126 of the sealing member 120 (see FIG. 4). Alternatively, surface 126 can include a groove and surface 108 can include a ridge. In some embodiments, neither of surfaces 108 and 126 includes an alignment feature, such as a ridge and groove. Opposite the sealing surface 108, the base 112 includes a welding surface 126 suitable for welding to another component, such as a container (e.g., a tank, a process vessel).

Extending through the base 112 is an aperture 128 having an inner opening 130 and an outer opening 132. The aperture 128 provides fluid communication with the fluid conduit 106 when the fluid conduit 106 is secured within the receptacle 104. Preferably, the inner opening 130 has a shape corresponding to a sectional shape of the fluid conduit 106 (e.g., circular and having a diameter, for example, from between about 0.5 and six inches, such as from about one to about three inches) and is sized at most about the same size as the fluid passageway of the fluid conduit 106.

Referring particularly to FIG. 2, aperture 128 extends through the base 112 in a direction perpendicular to a plane defined by the surface 145. However, aperture 128 can be angled relative to the surface 145. The openings 130 and 132 can be of about the same or of differing dimension (e.g., by tapering surface 134 of the aperture 128).

Extending outwardly from the wall 110 is a flange 136. The flange 136 includes a tapered surface 138 extending at an obtuse angle relative to an outer surface 140 of the wall 110. In some embodiments, the surface 138 extends outwardly at a square or acute angle relative to the outer surface 140. As will be described in greater detail below, the flange 136 (and a corresponding flange 154 of the collar 102) enables application of a clamp 142 or other fastener to secure the collar 102 and the receptacle 104 together.

A drainage passageway 143 extends through the wall 110 at an angle a (e.g., from about 15 to about 45 degrees, such as about 30 degrees) to the plane defined by the welding surface. Preferably, an opening of the passageway 143 is positioned near the floor 145 of the base 112. The receptacle can be formed without the passageway 143.

Figure 3:
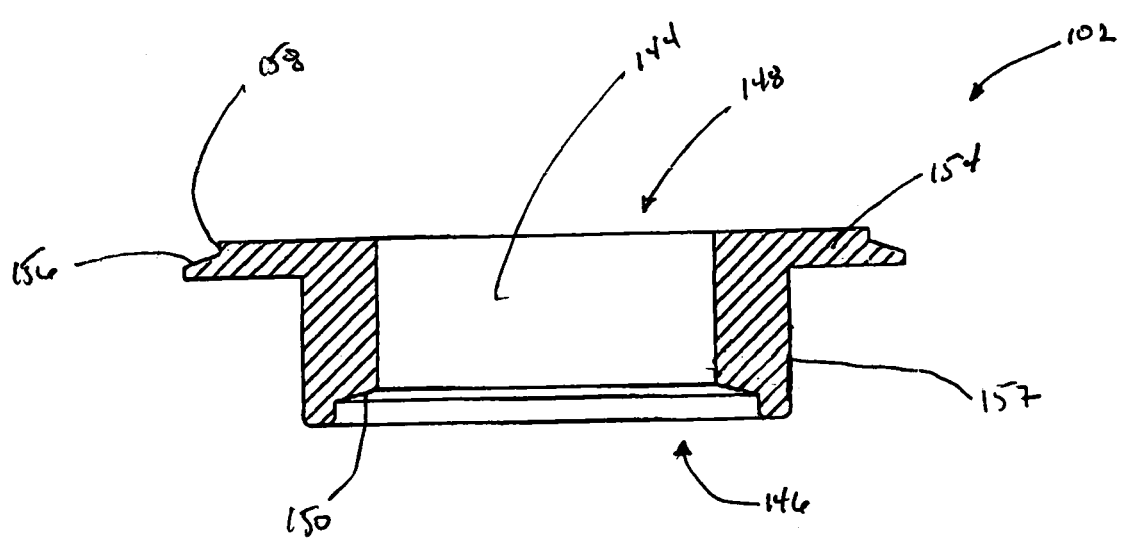
FIG. 3 is a sectional view of a collar of FIG. 1.

Referring now to FIG. 3, the collar 102 is configured to mate with the receptacle 104 (see FIG. 1). The collar 102 includes an aperture 144 having an inner opening 146 and an outer opening 148. The aperture 144 and openings 146, 148 are sized to receive the fluid conduit 106 (e.g., piping or tubing). As can be seen, opening 146 is larger than opening 148 forming a chamfered seating surface 150 against which a corresponding flanged surface 152 (see, for example, FIG. 4) of the fluid conduit 106 can seat.

A flange 154 extends outwardly from an outer surface 157 of the collar 102. The flange 154 has a tapered surface 156 extending at an obtuse angle relative to an outer surface 158 of the flange 154. As mentioned above, flanges 154 and 136 cooperate to enable application of a clamp 142 or other fastener to secure the collar and receptacle 104 together. The tapered surfaces 138 and 156 facilitate application of opposing clamping forces by, e.g., a clamp when the connector assembly is assembled.

The materials and processes used to form the receptacle 104 and the collar 102 can be selected as desired. Suitable materials include stainless steel and thermoplastics, such as polyethylene, polypropylene, polyvinylidene fluoride (e.g., Kynar®), polytetrafluoroethylene (e.g., Teflon®) or combinations thereof. The collar 102 and the receptacle 104 can be formed of the same or of differing materials. Suitable processes for forming the collar 102 and the receptacle 104 include machining, molding, casting, drawing, forging, stamping, and combinations thereof.

Figure 4:
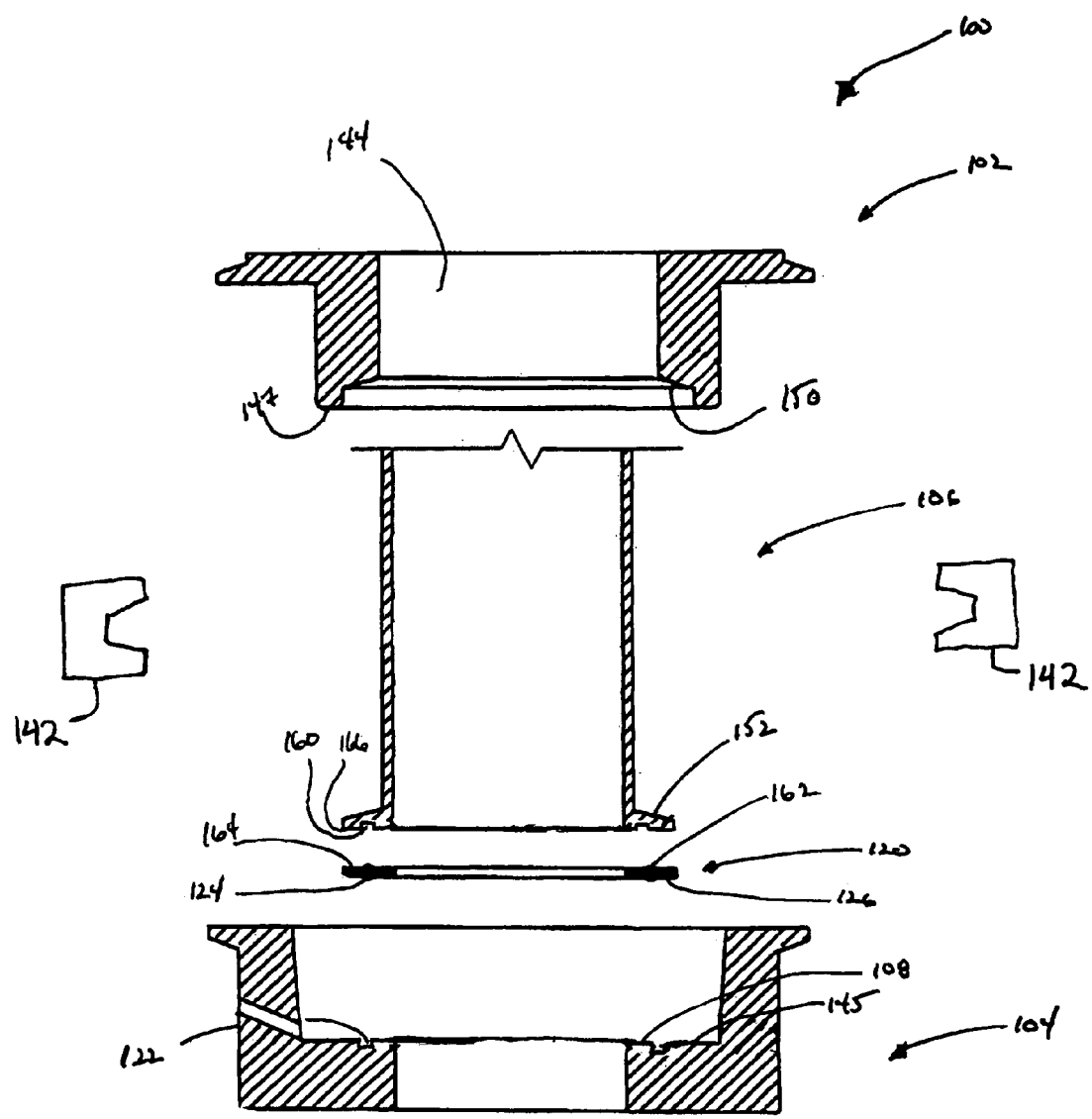
FIG. 4 is an exploded view of the fitting assembly of FIG. 1.

Referring now to FIG. 4, to assemble the fitting assembly 100, the fluid conduit 106 is inserted through aperture 144 of the collar 102. The sealing member 120 is positioned adjacent the sealing surface 108, mating the ridge 124 with the alignment groove 122. The surfaces 108 and 126 form opposing sealing surfaces when the fitting assembly 100 is assembled. The collar 102 and fluid conduit 106 are inserted in the receiving portion 116 of the receptacle 104. The fluid conduit 106 also includes a mating groove 160 formed at an end surface 166 of the fluid conduit that is capable of mating with a corresponding ridge 162 extending outwardly from a surface 164 of the sealing member 120. In some embodiments, the end surface 166 includes a groove and the sealing member 120 includes a mating ridge. Alternatively, neither of the surfaces 166 and 164 may include an alignment feature, such as a groove and ridge.

The flange 152 of the fluid conduit 106 is seated against the seating surface 150 within the collar 102. The end surface 166 is positioned against surface 164 of the sealing member 120, mating the groove 160 and the ridge 162. The end surface 166 and the surface 164 form a second pair of sealing surfaces when the fitting assembly 100 is assembled. Upon positioning the collar 102 and fluid conduit 106 within the receptacle 104 as described above, a clamp 142 (e.g., a tri-clamp) is fastened to the flanges 136 and 154.

Referring back to FIG. 1, the clamp 142 applies opposing clamping forces to tapered surfaces 138 and 156 in the direction of arrows 168 and 170 (e.g., about the full or only a portion of the circumference of the connector assembly 100). These clamping forces secure the collar 103 and the fluid conduit within the receptacle 104 and apply a compressive force against surfaces 126 and 164 of the sealing member 120. The fastener can also include a tapered surface to facilitate application of the clamping forces. A suitable fastener is a part number ILTC-300, available from I-4, Inc. To inhibit or even prevent over-tightening of the fitting assembly 100, a ledge 147 of the collar 102 contacts the floor 145 of the receptacle 104 with the fluid conduit 106 and sealing member 120 sandwiched between surfaces 108 and 150. This inhibits over compression of the sealing member 120, which can lead to excessively turbulent fluid flow into the fluid conduit 106, and prevents pockets of entrapped fluid as the container is emptied during use.

Typically, prior to assemblage of the connector assembly 100, the receptacle 104 is secured directly to a top, side or bottom of a container, such as a tank or process vessel.

Figure 5:
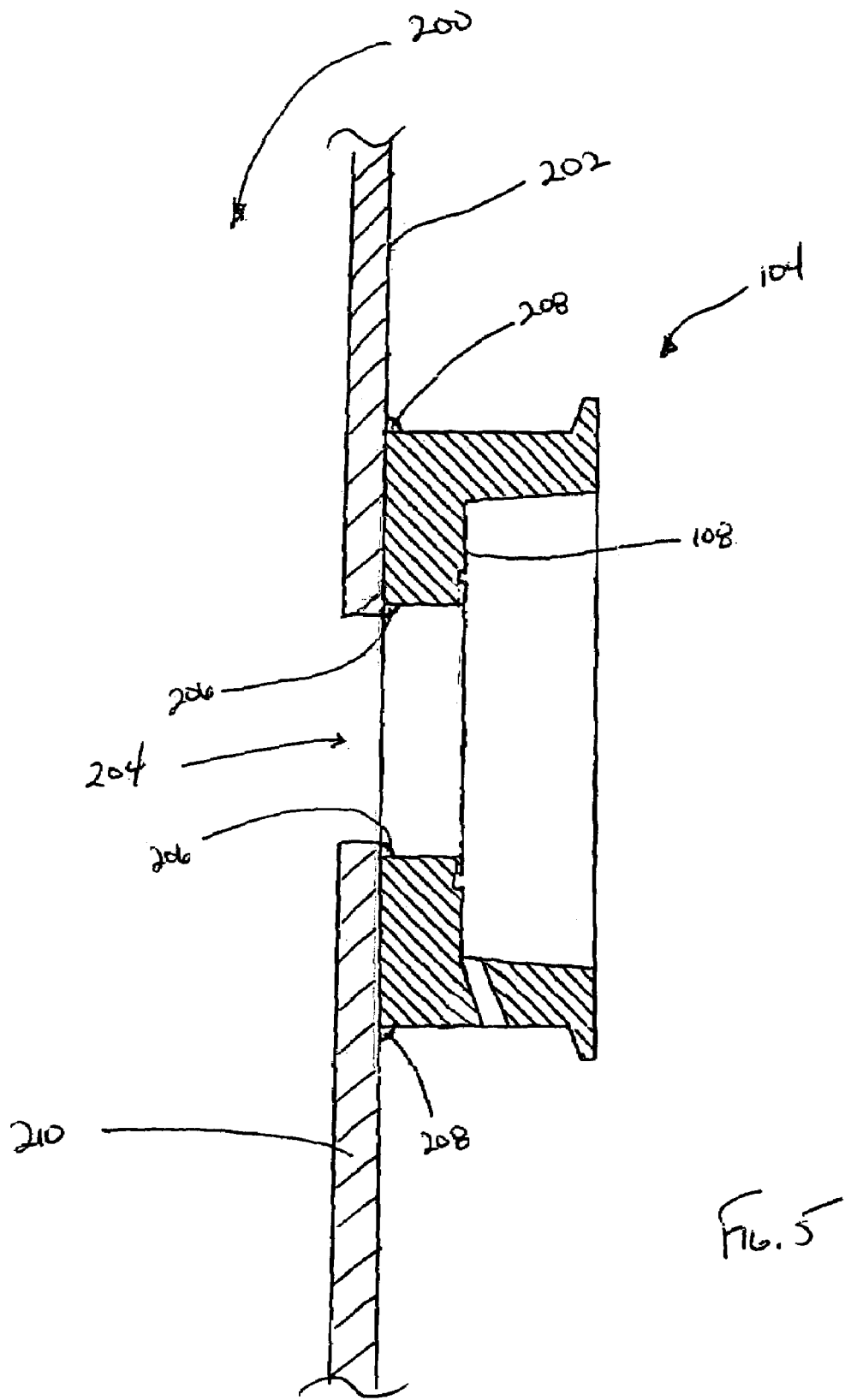
FIG. 5 is a sectional view of the receptacle of FIGS. 2 and 2A secured to a wall of a container.

Referring to FIG. 5, the receptacle 104 is secured to a side surface 202 of a container 200 (e.g., suitable for use in relatively high purity applications including processed waters or chemistries such as pharmaceuticals). A suitable container is available from Terracon Corporation at Holliston, Mass. Preferably, the receptacle 104 is secured to the side surface 202 by welding (e.g., hot inert gas plastic welding) along the inside diameter of outer opening 132 and along a perimeter of a hole 204 formed in the container 200. The hole 204 has a diameter slightly less than the diameter of the opening 132 to facilitate formation of an inner weld 206. Another weld 208 is formed along an outer diameter of the receptacle 104. The sealing member 120, fluid conduit 106 and collar 102 are secured within the receptacle 104, as described above. In cases where the container 200 and receptacle 104 are made from thermoplastic, the welding can be accomplished by first temporarily holding, clamping or otherwise adhering the receptacle 104 to the container 200, then applying a focused jet of heated nitrogen gas through a nozzle to the edge of surface 134 nearest opening 132 in receptacle 104 while simultaneously applying the same focused jet on the surface 202 of container 200 where it meets opening 132 of receptacle 104 and also simultaneously applying said focused jet on the surface of a length of welding rod (not shown) of the same material composition as the container 200 and receptacle 104. As these surfaces begin to melt, compressive force is applied to cause all three parts to fuse together. The focused jet is moved along the interface of opening 132, surface 202, and welding rod until a full circle of weld has been applied and the seam between container 200 and receptacle 104 has been completely sealed.

Referring back to FIG. 1 and also to FIG. 5, once assembled, the connector assembly 100 provides a secure, fluid-tight connection between the fluid conduit 106 and the container 200 with the aperture 128 of the receptacle 104 providing a fluid path from the container 200 to the fluid conduit 106 (or vice versa). By positioning the sealing surfaces 108, 126, 164 and 166 (FIG. 4) within the receptacle 104, they are positioned relatively near the container wall 210 and protected from, e.g., physical damage.

In some embodiments, the container 200 is in the form of a process vessel (e.g., an agitator or mixing chamber) in which fluids are to be combined, mixed, agitated, etc. By positioning the sealing surfaces relatively near the container wall 210, most, if not all, the material within the container 200 can be, for example, mixed, with relatively little dead leg. This can be accomplished by, for example, positioning a sampling mechanism or "septum" (not shown) between the sealing member 120 and the sealing surface 108 to inhibit flow out of the container. An example of such a device is the NovaSeptum® sampling unit available from NovAseptic America, Inc of Hampton, N.J. In these cases, the receptacle 104 is used more as an access port than a plumbing connection. The septum is a sampling device that is mounted to the side of the container via the receptacle 104, and is used to draw samples from the contents of the container without breaking sterility.

Figure 6:
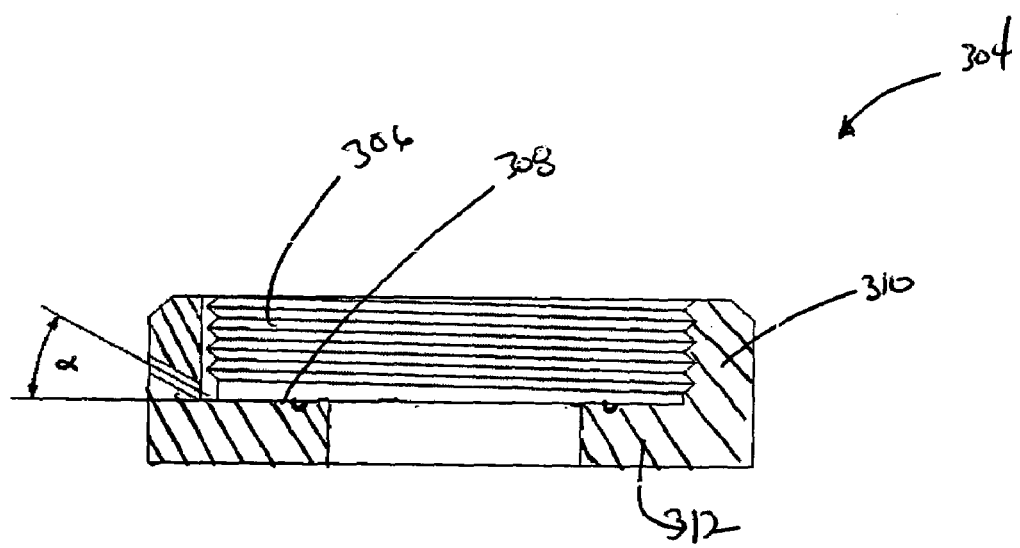
FIGS. 6 and 6A are sectional and top views, respectively, of another embodiment of a receptacle for use with a fitting assembly.
Figure 6A:
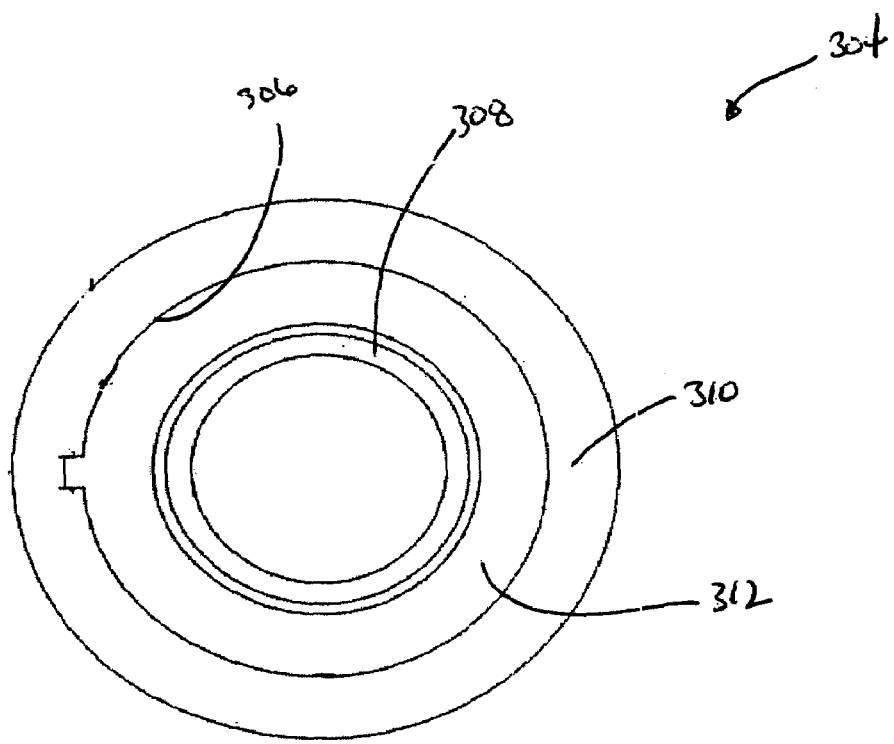

Referring to FIGS. 6 and 6A, another embodiment of a connector assembly includes a receptacle 304 that has a wall 310 with a threaded inner surface 306.

Figure 7:
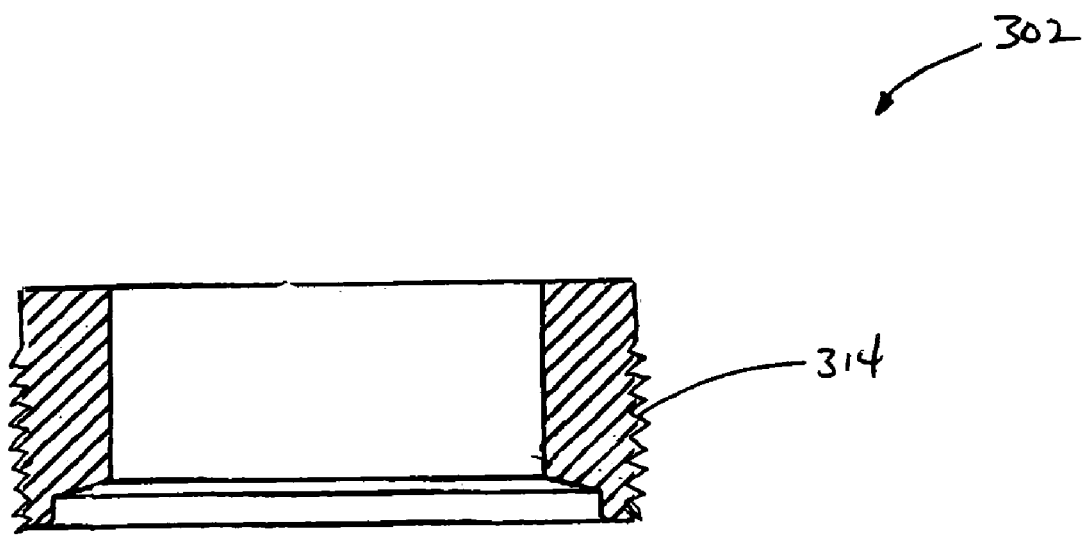
FIG. 7 is a sectional view of another embodiment of a collar configured to mate with the receptacle of FIGS. 6 and 6A.

Referring also to FIG. 7, the threaded inner surface 306 of the receptacle 304 is configured to mate with a threaded outer surface 314 of a collar 302, forming a fastener for connecting the collar and receptacle. Due to the threaded surface design of the receptacle 304 and collar 302, a separate fastener such as a clamp is no longer necessary. As above, the wall 310 extends about a periphery of a base 312, protecting a sealing surface 308 from damage. As another variation, the sealing member can be eliminated and the fluid conduit can be seated directly against the sealing surface of the receptacle (e.g., eliminating the sealing member) to form a seal.

A number of embodiments of the invention have been described. Nevertheless, it will be understood that various modifications may be made without departing from the spirit and scope of the invention. Accordingly, other embodiments are within the scope of the following claims.

What is claimed is:

1. An article for connecting a fluid conduit and a fluid container, the article comprising:
   a collar defining an opening therethrough, the opening configured to receive the fluid conduit;
   a receptacle configured to receive the fluid conduit, the receptacle including a base defining an opening for providing communication between the container and the fluid conduit and a sealing surface at least partially surrounded by a wall extending from the base, the wall configured to extend about the fluid conduit, the wall defining a passageway extending from an outer surface of the wall to an inner surface of the wall, and wherein the collar and the receptacle each include a flange extending outwardly from an associated outer surface; and a clamp for providing a force at a surface of the flanges capable of securing the collar and receptacle.

2. The article of claim 1 further comprising a sealing member seated adjacent the sealing surface.

3. The article of claim 2, wherein the sealing member is a gasket.

4. The article of claim 1, wherein the receptacle is configured to receive the collar and the fluid conduit, and the wall is configured to extend about the collar.

5. The article of claim 1 further comprising a fluid conduit extending through the opening of the collar.

6. The article of claim 5, wherein the fluid conduit includes a flange extending from an outer surface at an end of the fluid conduit.

7. The article of claim 6, wherein the flange of the fluid conduit is positioned between the collar and sealing surface.

8. The article of claim 7, wherein the collar includes a seating surface configured to seat against a surface of the flange of the fluid conduit.

9. The article of claim 5, wherein an end of the fluid conduit defines a second sealing surface.

10. The article of claim 9 further comprising a sealing member positioned between the sealing surfaces of the base and the fluid conduit.

11. An article for connecting a fluid conduit and a fluid container, the article comprising:
a collar defining an opening therethrough, the opening configured to receive the fluid conduit;
a receptacle configured to receive the fluid conduit, the receptacle including a base defining an opening for providing communication between the container and the fluid conduit and a sealing surface at least partially surrounded by a wall extending from the base, the wall configured to extend about the fluid conduit, the wall defining a passageway extending from an outer surface of the wall to an inner surface of the wall; and
a sealing member seated adjacent the sealing surface, wherein the sealing surface defines a groove configured to mate with a rib defined by a surface of the sealing member.

12. An article for connecting a fluid conduit and a fluid container, the article comprising:
a collar defining an opening therethrough, the opening configured to receive the fluid conduit;
a receptacle configured to receive the collar and the fluid conduit, the receptacle including a base defining an opening for providing communication between the container and the fluid conduit and a sealing surface at least partially surrounded by a wall extending from the base, the wall configured to extend about the fluid conduit and the collar, the wall defining a passageway extending from an outer surface of the wall to an inner surface of the wall; and
a clamp configured to secure the collar to the receptacle.

13. A container comprising:
an article disposed on the container, the article comprising a receptacle configured to receive a fluid conduit, the receptacle including a base defining an opening for providing fluid communication between the container and the fluid conduit and a sealing surface at least partially surrounded by a wall extending from the base, the wall configured to extend about the fluid conduit, the wall defining a passageway extending from an outer surface of the wall to an inner surface of the wall, and the base defining an outer surface, opposite the sealing surface, that is welded to the container.

14. The container of claim 13 wherein the outer surface of the base is welded to a surface of the container about at least one of an inner diameter of the opening of the base and an outer diameter of the periphery of the base.

15. The container of claim 14, wherein the outer surface of the base is welded to the surface of the container about both the inner diameter of the opening of the base and the outer diameter of the periphery of the base.

16. The container of claim 13 wherein the connector assembly further comprises a collar defining an opening therethrough, the opening configured to receive the fluid conduit.

17. The container of claim 16, wherein the receptacle is configured to receive the collar and the fluid conduit, the wall configured to extend about the collar.

18. The container of claim 17 further comprising a fastener configured to secure the collar to the receptacle.

19. The container of claim 18, wherein the fastener is defined by a threaded outer surface of the collar and a mating threaded inner surface of the wall.

20. The container of claim 18, wherein the fastener is a clamp.

21. The container of claim 16 further comprising a fluid conduit extending through the opening of the collar.

22. The container of claim 16, wherein the collar and the receptacle each include a flange extending outwardly from an associated outer surface.

23. The container of claim 22 further comprising a clamp for providing a force at a surface of the flanges capable of securing the collar and receptacle.

24. An article for connecting a fluid conduit and a fluid container, the article comprising:
a collar defining an opening therethrough, the opening configured to receive the fluid conduit;
a receptacle configured to receive the fluid conduit, the receptacle including a base defining an opening for providing communication between the container and the fluid conduit and a sealing surface at least partially surrounded by a wall extending from the base, the wall configured to extend about the fluid conduit, the wall defining a passageway extending from an outer surface of the wall to an inner surface of the wall; and
a sealing member seated adjacent the sealing surface;
wherein the collar has a ledge to inhibit over-compression of the sealing member when the collar is secured to the receptacle, with the ledge contacting the sealing surface, and the sealing member is seated adjacent the sealing surface.

* * * * *